United States Patent
Goncalves

[19]

[11] Patent Number: 5,975,354
[45] Date of Patent: Nov. 2, 1999

[54] CONTAINER DISPENSER CAPSULE WITH OFF-CENTER APERTURE, AND ITS METHOD OF MANUFACTURE

[75] Inventor: Agnès Goncalves, Soisy Sous Montmorency, France

[73] Assignee: Defi International, Montmorency, France

[21] Appl. No.: 08/983,145

[22] PCT Filed: May 23, 1997

[86] PCT No.: PCT/FR97/00905

§ 371 Date: Jan. 23, 1998

§ 102(e) Date: Jan. 23, 1998

[87] PCT Pub. No.: WO97/45330

PCT Pub. Date: Dec. 4, 1997

[30] Foreign Application Priority Data

May 24, 1996 [FR] France ................................ 96 06455
Feb. 11, 1997 [FR] France ................................ 97 01563

[51] Int. Cl.[6] .................................................... B67D 5/32
[52] U.S. Cl. ........................... 222/39; 222/490; 222/494; 222/548; 222/555
[58] Field of Search ................ 222/39, 92, 490, 222/494, 548, 555, 1

[56] References Cited

U.S. PATENT DOCUMENTS

| | | | |
|---|---|---|---|
| 2,324,032 | 7/1943 | Schlabach | 221/64 |
| 5,111,967 | 5/1992 | Schreiber | 222/39 |
| 5,161,718 | 11/1992 | Gueret | 222/494 |
| 5,542,670 | 8/1996 | Morano | 222/494 |
| 5,730,322 | 3/1998 | Iba et al. | 222/548 |

FOREIGN PATENT DOCUMENTS

| | | | |
|---|---|---|---|
| 2160318 | 6/1973 | France. | |
| 1143440 | 2/1963 | Germany. | |
| 1576126 | 10/1980 | United Kingdom. | |
| 2182027 | 5/1987 | United Kingdom | 222/548 |
| WO95/11172 | 4/1995 | WIPO. | |

Primary Examiner—Joseph A. Kaufman
Attorney, Agent, or Firm—Greenblum & Bernstein, P.L.C.

[57] ABSTRACT

A dispensing capsule for a container, a container incorporating the capsule, and a method of manufacture. The capsule includes a product passage reducer, integral with or mounted fixedly on the container and a cap forming a cover, rotatably mounted with respect to the reducer, the reducer and the cap each being provided with an off-center aperture so as to ensure the opening and closing of the capsule by superposing or offsetting the apertures with respect to each other during cap rotation. The top internal surface of the cap includes a joint provided with or forming an off-center slit diaphragm which is located beneath the cap aperture, while the reducer has two projecting funnels offset at an angle, which are off-centered to the same extent as the cap aperture, and the ends of which, in contact with the joint, are opened and closed respectively, the reducer aperture being constituted by the opening of the open funnel such that the capsule opening and closing, respectively, are effected by cap rotation and by superposing the cap aperture and its slit diaphragm with the open funnel or the closed funnel, respectively, of the reducer.

26 Claims, 5 Drawing Sheets

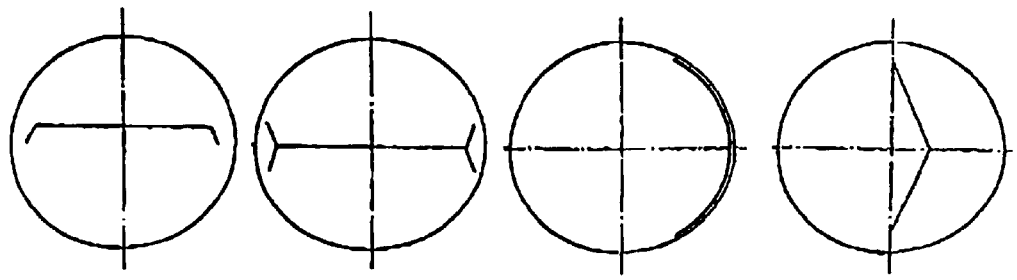
FIG.10     FIG.11     FIG.12     FIG.13
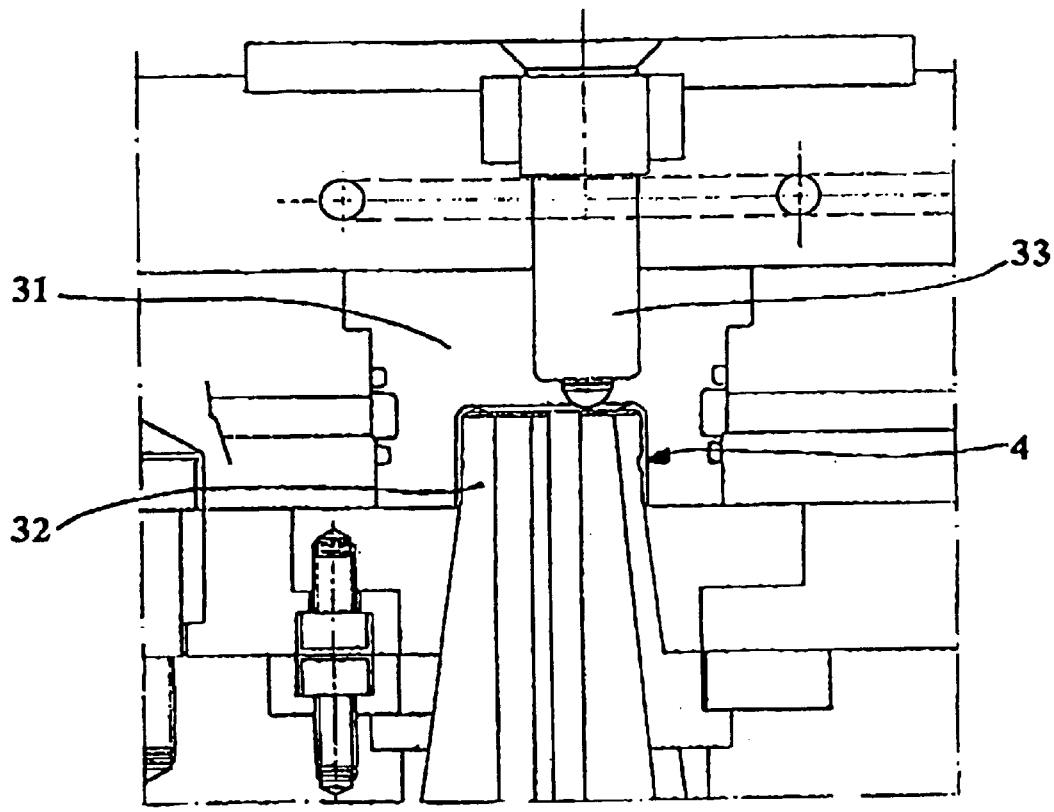
FIG.14

CONTAINER DISPENSER CAPSULE WITH OFF-CENTER APERTURE, AND ITS METHOD OF MANUFACTURE

BACKGROUND OF THE INVENTION

1. Field of the Invention

The present invention relates to a dispenser capsule with an off-center aperture for a container having a product to dispense, and more specifically a liquid or pasty product.

2. Description of Background and Relevant Information

The dispensing capsules preferably replace the simple screw-on caps, said capsules remaining coupled to the container, while the opening and closing are effected by a special maneuvering of the cap.

A capsule is known, for example, which includes, on the one hand, a cap provided with a central dispensing aperture mounted to be screwed and unscrewed between at least two positions, by means of at least one threading provided on the band or neck of the container, and, on the other band, a reducer integral with or attached to the band and provided with a closing end piece, so as to close the aperture of the cap at will depending on its position on the band. With this type of capsule, a more or less substantial remainder of the product usually remains on the top of the cap after use and closure.

A capsule for a container is also known which includes a cover or a reducer integral with or mounted fixedly on the container and a cap rotatably mounted with respect to the said cover, the latter and the cap each being provided with an off-center aperture so as to ensure the opening and closing of the capsule by respectively superposing or offsetting the said apertures with respect to each other during cap rotation.

In this case, the cap rotation is effected in one plane, i.e. without screwing or unscrewing.

By way of example, the documents U.S. Pat. No. 2,324,032 for powdery products, DE-1,143,440 and also WO-9511172 can be cited according to one of its embodiments.

The current systems for liquid or pasty products generally do not provide the product with proper sealing and, generally speaking, the open position by superposing the apertures is often random. In the last cited document, it was necessary to provide all of the surfaces which are in contact in the open and closed positions, in the form of sealing lips whose contours must be studied specifically.

SUMMARY OF THE INVENTION

Therefore, the inventor is proposing a capsule of the aforementioned type, but wherein the top internal surface of the cap comprises a joint provided with or forming an off-center slit diaphragm which is located beneath the cap aperture, while the reducer has two projecting funnels offset at an angle, which are off-center to the same extent as the cap aperture, and the ends of which in contact with the joint are closed and open respectively, the reducer aperture being constituted by the opening of the open funnel such that the capsule opening and closing respectively, are effected by cap rotation and by superposing the cap aperture and its slit diaphragm with the open funnel or the closed funnel respectively of the reducer.

According to one embodiment, the cap is provided with an opening allowing the joint to appear so as to constitute a mark to be aligned with the fixed distinctive reference marks to locate the open and closed positions of the capsule.

Complementarily, or according to another embodiment, the lateral wall of the cap bears a mark adapted to be aligned with the fixed distinctive reference marks to locate the open and closed positions of the cap.

For example, the fixed reference marks are arranged on a peripheral base of the reducer.

The container can be a vial or a tube to which the reducer is affixed.

Various other means can also be provided.

Thus, the cap can be provided, for example, with at least one internal longitudinal bar adapted to cooperate with notches provided on a base of the reducer so as to temporarily lock the cap in the open and closed positions.

Furthermore, the cap can also comprise at least one limit stop adapted to cooperate with connected abutments arranged on the reducer to limit the rotative movement of the cap between the open and closed positions. In this case and according to a particular embodiment, the cap abutment is displaced in an annular channel formed by two concentric walls of the reducer between which the abutments of the reducer are provided.

It is also provided for the cap and the reducer to comprise bars adapted to forcibly pass one another during rotation of the said cap for opening and closing by making an audible signal.

The joint of the cap is advantageously made by duplicate molding.

After manufacturing the cap by injection of polypropylene, for example, it is known to cast a piece, such as a joint, during a second operation after transferring it to another station and by means of another tool, which results in low manufacturing rates while it is also very difficult to obtain thin walls for each of the pieces.

That is why in the case of a cap manufactured in an injection mold provided with at least one fixed cope and one mobile cope, the invention proposes a completely original and advantageous manufacturing process, wherein the duplicate molding of the joint is also effected by injection in the same injection mold used for molding the cap, after a simple set back of at least a part of the mobile cope and by means of at least one opening provided on the top of the cap, which opening is then closed by at least the constitutive material of the joint.

In such a case, the joint, for example made of elastomer, which can be particularly thin, is perfectly sealed to the internal wall on the top of the cap, while the slit diaphragm arranged under the aperture maintains all of its flexibility. Moreover, the process according to the invention lowers the cost and increases production rates since there is but one mold.

BRIEF DESCRIPTION OF THE DRAWINGS

The invention will be understood and other particularities will become apparent upon reading the following description which refers to the annexed drawings in which:

FIGS. 10–13 schematically show four embodiments of slit diaphragms;

FIG. 14 shows a part of an injection mold for manufacturing the cap of a capsule according to the invention.

DETAILED DESCRIPTION OF THE INVENTION

Figure 8:
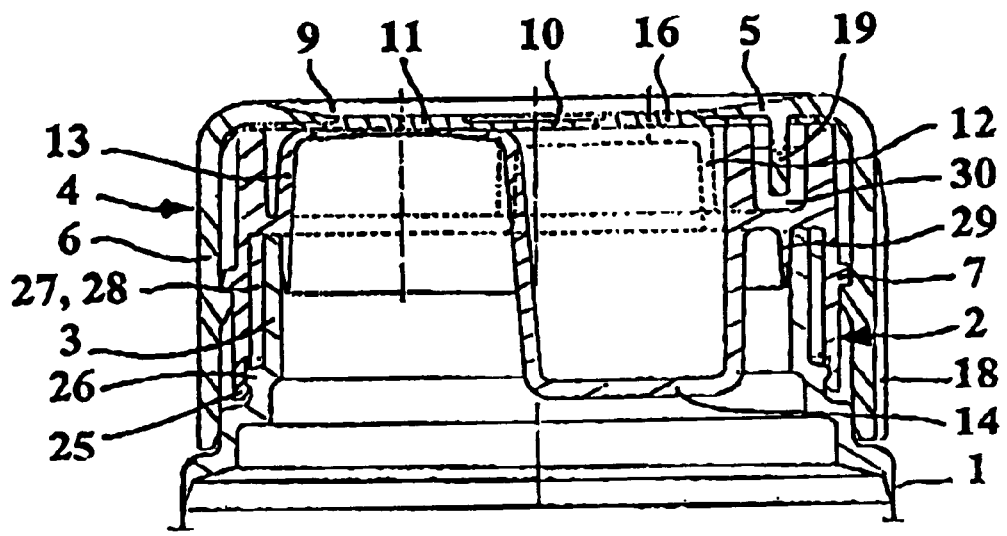
FIG. 8 is an axial cross section of a cap according to the invention, more specifically adapted to equip a tube.
Figure 9:
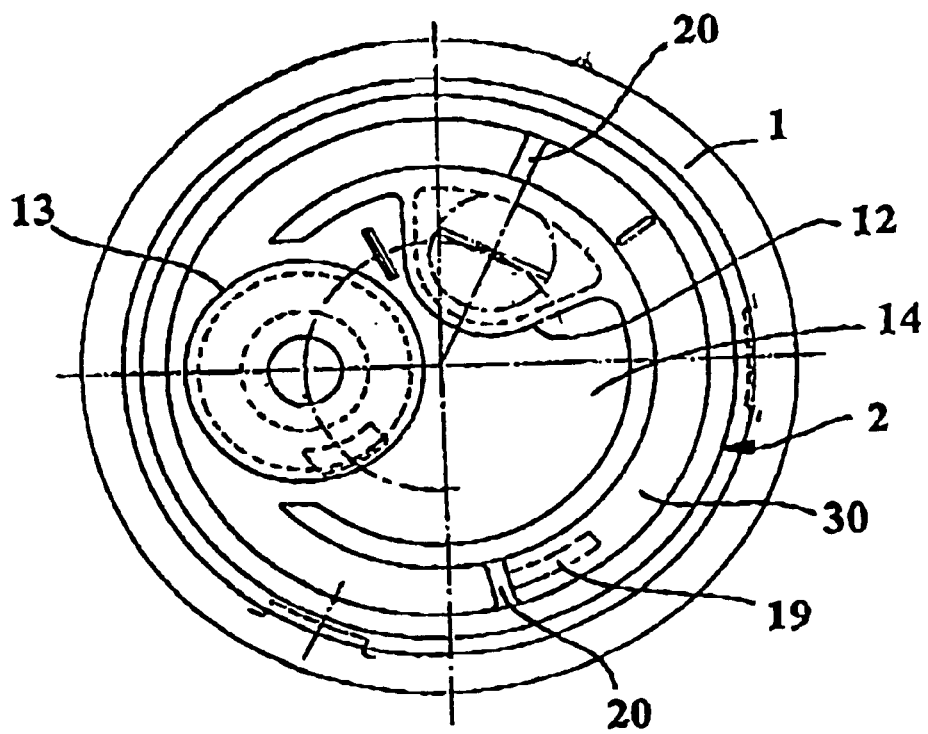
FIG. 9 is a top view of the embodiment of FIG. 8 without its cap.

The embodiment of FIGS. 8 and 9 is very close to the embodiment of the other Figures such that the similar or analogous elements have the same references.

A capsule according to the invention is adapted to equip a container 1 in the form for example of a vial (FIG. 1), or a tube (FIGS. 8 and 9).

The capsule according to the invention comprises a reducer 2 which is fixed to or attached to the band or neck 3 of the container 1, but the reducer 2 could directly constitute the head or neck of the container 1.

The reducer 2 is covered by a cap 4 which is formed by an upper portion or top 5 and a lateral wall 6 (of an outer form biconvex in FIGS. 1–5 and circular in FIGS. 8 and 9), and which is rotatably mounted on the reducer 2, for example by gripping by means of a rib 7 provided on an inner skirt 8 (FIGS. 1 and 4) or on the internal part of the lateral wall 6 of the cap 4 (FIG. 8) and which is adapted to cooperate with a connected rib of the reducer.

The top or end 5 of the cap 4 is provided with an off-centered and widened aperture 9 while the internal wall of the top or end 5 of the cap 4 is provided with a joint 10 made of elastomer, for example, which joint is equipped with or constitutes an off-center slit diaphragm 11 which is arranged beneath the cap aperture 9. The slits of the diaphragm 11 are obtained, for example, through cold shot by means of a punch, allowing the slits to conserve a memory of form and to regain their original position after being deformed under pressure.

All types of slits can be envisioned as shown in FIGS. 2, 3, 5 and 10–13 which represent rectilinear slits in the shape of a cross (FIGS. 2, 3, 5) or with ends which form angles (FIGS. 10 and 11), or of an arc of circle (FIG. 12), or yet in the shape of a V (FIG. 13), etc.

The joint 10 is advantageously duplicate molded in the cap 4, as will be explained hereinafter.

Figure 1:
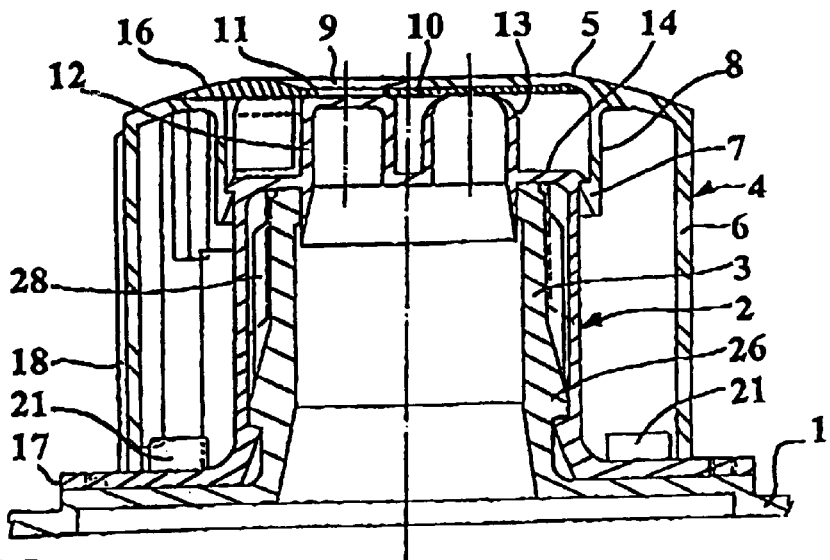
FIG. 1 is an axial cross section of a capsule according to the invention, in the closed position.
Figure 4:
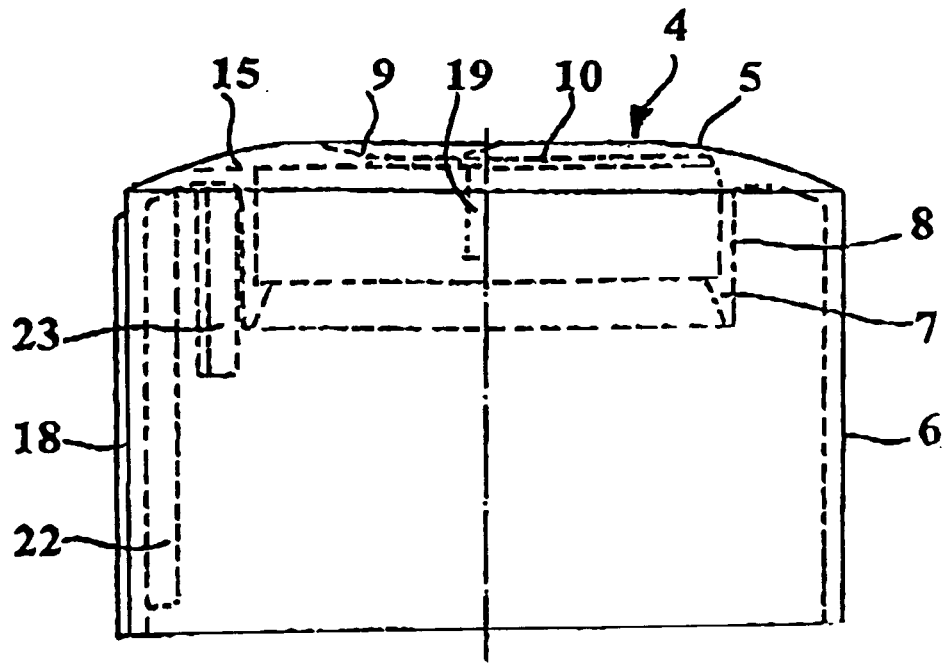
FIG. 4 is an elevation view of a cap according to the invention.
Figure 5:
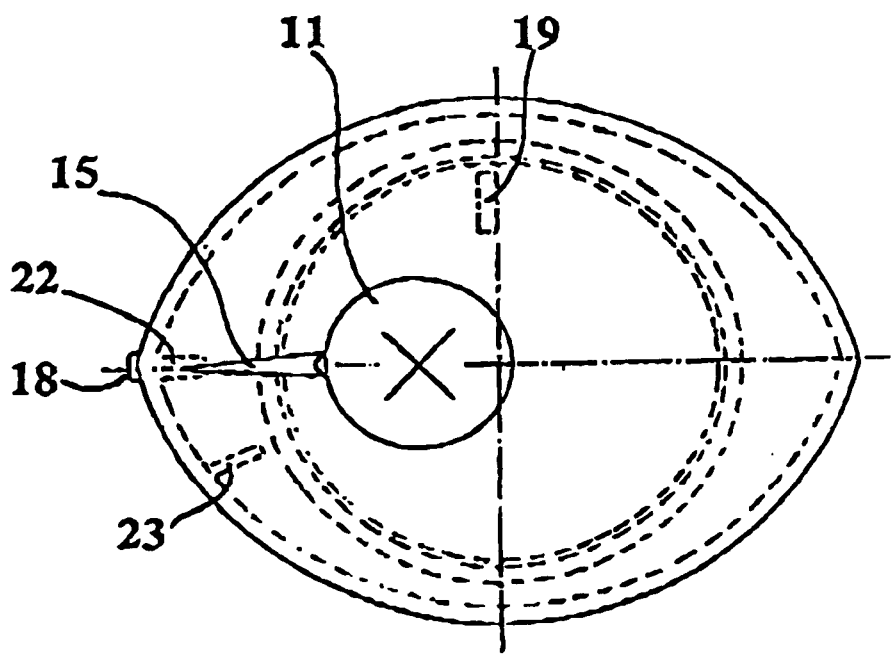
FIG. 5 is a top view of the cap of FIG. 4.
Figure 6:
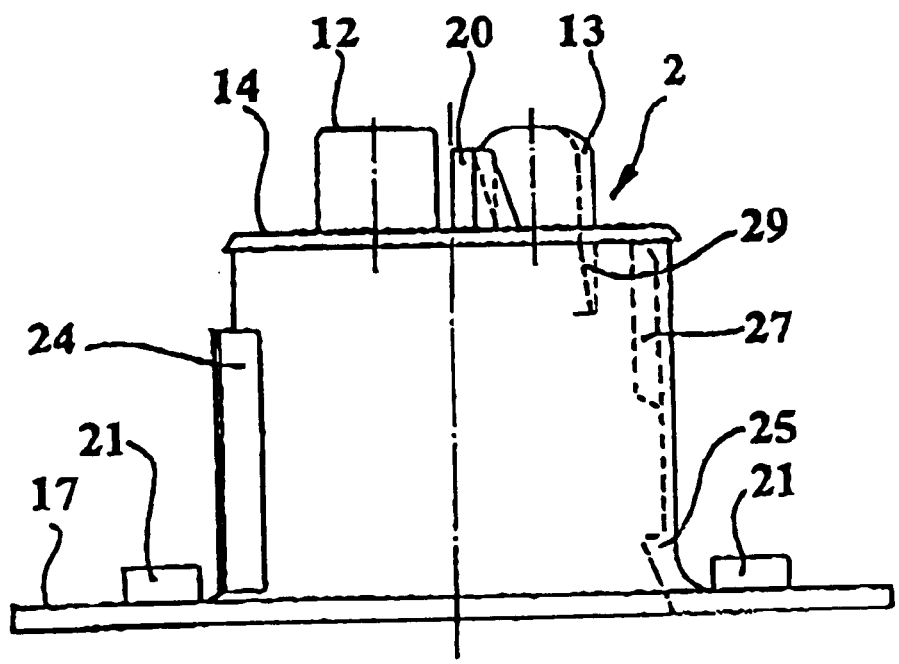
FIG. 6 is an elevation view of a reducer according to the invention.
Figure 7:
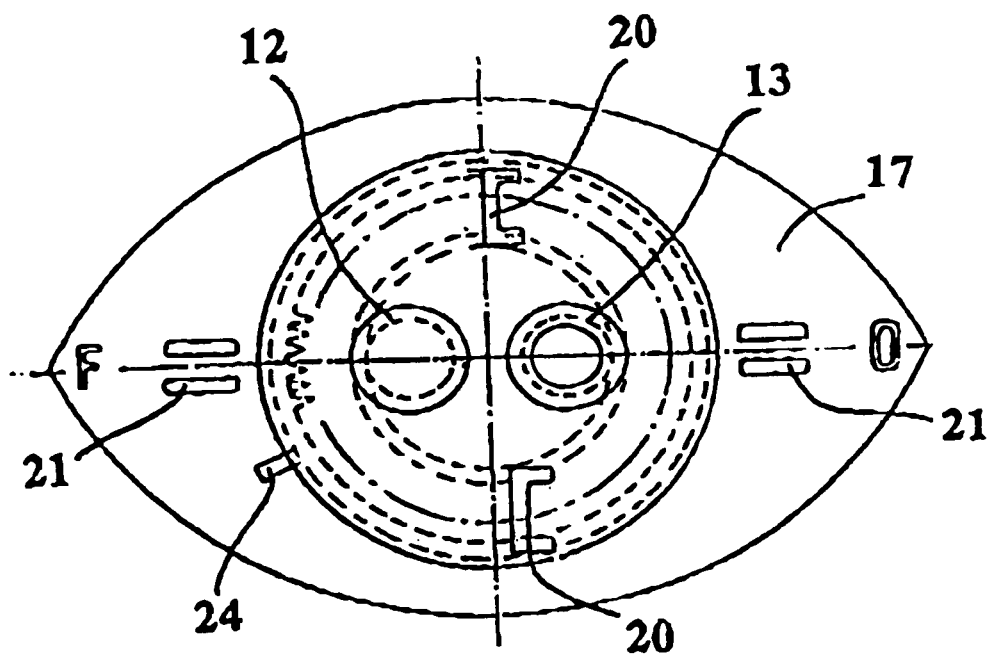
FIG. 7 is a top view of the reducer of FIG. 6.

The reducer 2, as shown in FIGS. 1, 6 and 8, comprises two funnels 12 and 13, diametrically opposed for the embodiment of FIGS. 1–7, projecting from a plate 14 (more visible in FIGS. 1, 6 and 8) and which are off-center to the same extent as the aperture 9 and the diaphragm 11. The funnels 12 and 13 have ends closed and open respectively which are on the level of the internal surface of the joint 10, the opening of the funnel 13 can be provided with a sealing lip.

Moreover, the top 5 of the cap 4 comprises an opening 15 (FIGS. 4 and 5) in the shape of an arrow allowing a portion 16 of the joint 10 to appear (FIGS. 1–3 and 8) so as to be aligned with fixed reference marks, for example, engraved on or projecting from a base 17 of the reducer 2 (FIGS. 1–3 and 6), or on the container 1 itself The reference marks are, for example, the letters "O" (as in Open) and "F" (as in Closed) while the base 17 can be perpendicular to the lateral wall 6 of the cap 4 (FIGS. 1–3, 6 and 7).

Instead of, or in addition thereto, a mark 18 (FIGS. 1–5 and 8), for example in projection, is placed on the lateral wall 6 of the cap.

The arrow 16 and/or the marks 18, by being aligned with the reference marks "O" and "F" make it possible to locate the open and closed positions (visible from the top and/or laterally) as will be explained below.

Figure 2:
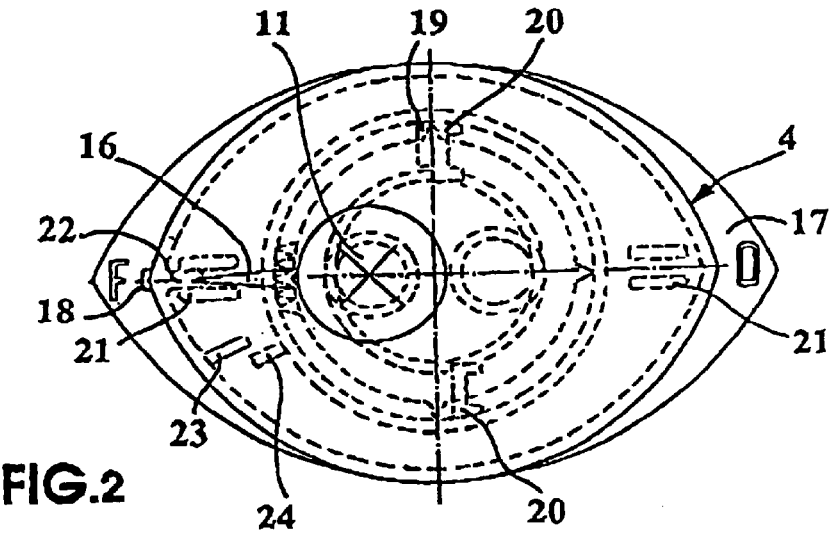
FIG. 2 is a top view of the capsule of FIG. 1.
Figure 3:
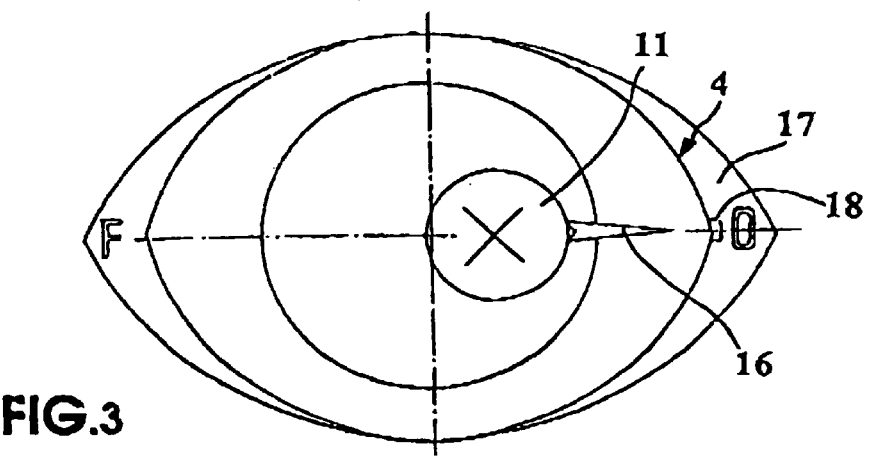
FIG. 3 is a simplified top view (without dotted lines) in the closed position.

Furthermore, the cap 4 comprises a limit stop 19 (FIGS. 2, 4, 5 and 8 and the position of which is schematically shown by dotted lines in FIG. 9) adapted to cooperate with abutments 20 arranged on the plate 14 of the reducer 2 (FIGS. 2, 6, 7 and 9). In the embodiment of FIGS. 8 and 9, the stop 19 of the cap 4 is further displaced in an annular channel 30 formed by two concentric walls of the reducer between which are provided the abutments 20 of the reducer, while the base 17 of the embodiment of FIGS. 1-7 have diametrically opposed notches 21 (FIGS. 1, 2, 6 and 7) adapted to cooperate with an internal longitudinal bar 22 provided on the interior part of the lateral wall 6 of the cap 4 (FIGS. 2, 4 and 5).

Also, the cap 4 and the reducer 2 are provided with bars 23 and 24 respectively (FIGS. 2, 4 and 7) passing each other forcibly, as it will be explained.

The reducer 2 is positioned on the container 1 by sealing, or attachment in this case, by means of, for example, connected ribs 25, 26 provided on the reducer (FIGS. 6 and 8) and on the band or neck 3 of the container (FIGS. 1 and 8), respectively, and antirotation grooves 27, 28 arranged on the reducer and on the exterior of the band 3 (FIGS. 1, 6 and 8) respectively, an interior skirt 29 of the reducer (FIGS. 6 and 8) being housed in the band 3, then the rotating cap 4 is attached as mentioned previously.

The operation of the dispenser of the invention is simple to understand.

In the closed position of FIG. 1, the closed funnel 12 of the reducer 2 is located under the diaphragm 11 and prevents any passage of the product, while the open end of the funnel 13 is closed by the joint 10 on which the funnel is under slight pressure.

In this position, the stop 19 of the cap is in contact with one of the abutments 20 of the reducer and the bar 22 of the cap is located in one of the notches 21 of the base of the reducer (FIG. 2), which ensures a perfect positioning and a temporary locking.

It is further noted that in this position, the mark 18 and the arrow 16 of the cap are aligned with the "F" mark of the reducer.

To open the capsule, it suffices to rotate the cap 4 halfway in the embodiment of FIGS. 1–7, and for the embodiment of FIGS. 8 and 9, a bit less than halfway in the circular direction by looking on the top of the cap, so that the bar 22 is locked in the diametrically opposed notch 21 of the reducer, and the stop 19 comes in contact with the other abutment 20 of the reducer.

During this movement, an audible signal is generated by the forced fitting of the bars 23, 24 while the mark 18 and the arrow 16 are aligned with the "O" reference mark of the reducer.

In this position (FIGS. 3 and 8), it is noted that the open funnel 13 is positioned under the slit diaphragm 11 and it is understood that the product can be dispensed through the slits of the diaphragm by pressing on the container.

It is also understood that the slit diaphragm ensures an anti-impurity protection as it is naturally self-closing, the form and the number of slits are chosen depending especially on the viscosity of the product. This diaphragm avoids any ill-timed outflow of the product.

Finally, to close the capsule, it suffices to reverse the movement, as rotating in one plane ensures a perfect cleanliness during handling.

Of course, other particularities can be envisioned without leaving the scope of the invention, such as, a detachable protection pad, for example, provided above the dispensing aperture and adapted to be removed before the first use.

Furthermore, the internal surface of the top 5 of the cap can advantageously have a small dome projecting inward, adapted to be introduced, in a closed position, into the opening of the funnel 13, while the said dome cannot be covered by the joint 10, which does not prevent the edge of the opening, which possibly provided with a sealing lip, as mentioned earlier, from being applied to the joint 10.

The cap 4 is obtained, for example, by polypropylene injection in a mold of the type represented in FIG. 14 and comprising essentially a fixed cope 31 and a mobile cope 32 activated conventionally by a piston.

According to an original and advantageous process, as mentioned previously, after the cap 4 molding, for example in a channel located near what will be the base of its lateral wall 6 and by means of a traditional injection nozzle not shown, the injection of the joint 10 is successively done in the same mold by slightly setting back the mobile mold 32, for example by 0.2 millimeters, and by injecting an elastomer by means of an injection nozzle 33, preferably hot, as shown in FIG. 14.

In FIG. 14, it is readily noted that the cope 32 used for the cap molding, is slightly set back along the desired thickness for the joint 10.

This second injection is done through an opening provided in the cap 4, for example through the opening 15 (FIGS. 4 and 5) which was discussed previously and which lets a part 16 of the joint appear.

However, it is even possible depending on the applications to provide only a very small injection hole which can be plugged up afterwards.

What is claimed:

1. A dispensing capsule for a container, for dispensing a product from the container, said dispensing capsule comprising:
   a product passage reducer adapted to extend along an axis from the container, said reducer having an aperture off-centered from the axis to a determinate extent;
   a cap rotatably mounted over said reducer, said cap having an aperture off-centered to said determinate extent, said cap being mounted for rotation with respect to said reducer for selectively:
      superposing said off-centered aperture of said cap with said off-centered aperture of said reducer for opening the capsule; and
      offsetting said off-centered aperture of said cap with said off-centered aperture of said reducer for closing the capsule;
   said cap having an end, said end having an internal surface;
   a joint positioned on said internal surface of said end of said cap, said joint having an off-centered slit diaphragm positioned in alignment with said aperture of said cap;
   said reducer having two axially extending funnels, each of said funnels being off-centered to said determinate extent, each of said funnels having an end in contact with said joint, the end of a first of said two funnels being open, the end of a second of said two funnels being closed, said open end of said first of said two funnels constituting said off-centered aperture of said reducer, whereby:
      said opening the capsule is effected by cap rotation to superpose said cap aperture and said slit diaphragm of said joint with said open end of said first of said two funnels; and
      said closing the capsule is effected by cap rotation to superpose said cap aperture and said slit diaphragm of said joint with said closed end of said second of said two funnels.

2. A dispensing capsule according to claim 1, wherein:
   said cap has an opening, a portion of said joint being visible through said opening, said portion of said joint visible through said opening constituting a mark adapted to be aligned with fixed distinctive reference marks for locating open and closed positions, respectively, of said capsule.

3. A dispensing capsule according to claim 2, wherein:
   said reducer has a peripheral base and said fixed distinctive reference marks are located on said peripheral base.

4. A dispensing capsule according to claim 1, wherein:
   said cap has a lateral wall, said lateral wall of said cap having a mark adapted to be aligned with fixed distinctive reference marks for locating open and closed positions, respectively, of said capsule.

5. A dispensing capsule according to claim 4, wherein:
   said reducer has a peripheral base and said fixed distinctive reference marks are located on said peripheral base.

6. A dispensing capsule according to claim 1, wherein:
   said cap comprises an internal longitudinal bar;
   said reducer has a base, said base of said reducer has a plurality of notches, said plurality of notches mechanically cooperating with said longitudinal bar for temporarily locking said cap in respective open and closed positions.

7. A dispensing capsule according to claim 1, wherein:
   said cap is provided with at least one limit stop;
   said reducer is provided with abutments mechanically cooperating with said at least one limit stop for limiting rotational movement of said cap between open and closed positions.

8. A dispensing capsule according to claim 7, wherein:
   said reducer is provided with an annular channel formed by two concentric walls, said abutments being positioned between said two concentric walls;
   said at least one abutment is positioned for movement within said annular channel.

9. A dispensing capsule according to claim 1, wherein:
   said reducer and said cap have respective bars positioned for forcibly passing one another and making an audible signal during rotation of said cap during said opening and said closing of the capsule.

10. A container in combination with a dispensing capsule according to claim 1, wherein:
    said container has a neck and said reducer of said dispenser is fixed to said neck.

11. A container in combination with a dispensing capsule according to claim 1, wherein:
    said container has a neck constituted by said reducer of said dispenser.

12. A dispensing capsule for a container, for dispensing a product from the container, said dispensing capsule comprising:

a product passage reducer adapted to extend along an axis from the container, said reducer having two axially extending off-centered funnels, each of said funnels having an end, the end of one of said two funnels being open, the end of the other of said two funnels being closed, said open funnel end constituting an aperture off-centered to a determinate extent;

a cap rotatably mounted over said reducer, said cap having an end with an aperture off-centered to said determinate extent, said cap being mounted for rotation about said axis with respect to said reducer, said end of said cap having an internal surface;

a joint positioned on said internal surface of said end of said cap, said joint having an off-centered slit diaphragm positioned in alignment with said off-centered aperture of said cap;

whereby opening of the capsule is effected by rotation of said cap to superpose said cap aperture and said slit diaphragm of said joint with said open funnel end; and whereby closing the capsule is effected by rotation of said cap to superpose said cap aperture and said slit diaphragm of said joint with said closed funnel end.

13. A dispensing capsule according to claim 12, wherein:

said cap has an opening, a portion of said joint being visible through said opening, said portion of said joint visible through said opening constituting a mark adapted to be aligned with fixed distinctive reference marks for locating open and closed positions, respectively, of said capsule.

14. A dispensing capsule according to claim 13, wherein:

said reducer has a peripheral base and said fixed distinctive reference marks are located on said peripheral base.

15. A dispensing capsule according to claim 12, wherein:

said cap has a lateral wall, said lateral wall of said cap having a mark adapted to be aligned with fixed distinctive reference marks for locating open and closed positions, respectively, of said capsule.

16. A dispensing capsule according to claim 15, wherein:

said reducer has a peripheral base and said fixed distinctive reference marks are located on said peripheral base.

17. A dispensing capsule according to claim 12, wherein:

said cap comprises an internal longitudinal bar;

said reducer has a base, said base of said reducer has a plurality of notches, said plurality of notches mechanically cooperating with said longitudinal bar for temporarily locking said cap in respective open and closed positions.

18. A dispensing capsule according to claim 12, wherein:

said cap is provided with at least one limit stop;

said reducer is provided with abutments mechanically cooperating with said at least one limit stop for limiting rotational movement of said cap between open and closed positions.

19. A dispensing capsule according to claim 18, wherein:

said reducer is provided with an annular channel formed by two concentric walls, said abutments being positioned between said two concentric walls;

said at least one abutment is positioned for movement within said annular channel.

20. A dispensing capsule according to claim 12, wherein:

said reducer and said cap have respective bars positioned for forcibly passing one another and making an audible signal during rotation of said cap during said opening and said closing of the capsule.

21. A container in combination with a dispensing capsule according to claim 12, wherein:

said container has a neck and said reducer of said dispenser is fixed to said neck.

22. A container in combination with a dispensing capsule according to claim 12, wherein:

said container has a neck constituted by said reducer of said dispenser.

23. A method of manufacturing a joint for a dispensing capsule for a container, in which the capsule comprises a product passage reducer adapted to extend along an axis from the container, said reducer having an aperture off-centered from the axis to a determinate extent; a cap rotatably mounted over said reducer, said cap having an aperture off-centered to said determinate extent, said cap being mounted for rotation with respect to said reducer for selectively (1) superposing said off-centered aperture of said cap with said off-centered aperture of said reducer for opening the capsule, and (2) offsetting said off-centered aperture of said cap with said off-centered aperture of said reducer for closing the capsule; said cap having an end, said end having an internal surface; said joint being positioned on said internal surface of said end of said cap, said joint having an off-centered slit diaphragm positioned in alignment with said aperture of said cap; said reducer having two axially extending funnels, each of said funnels being off-centered to said determinate extent, each of said funnels having an end in contact with said joint, the end of a first of said two funnels being open, the end of a second of said two funnels being closed, said open end of said first of said two funnels constituting said off-centered aperture of said reducer, whereby said opening the capsule is effected by cap rotation to superpose said cap aperture and said slit diaphragm of said joint with said open end of said first of said two funnels, and said closing the capsule is effected by cap rotation to superpose said cap aperture and said slit diaphragm of said joint with said closed end of said second of said two funnels, said method comprising:

manufacturing said joint by duplicate molding.

24. A method of manufacturing a cap and a joint for a dispensing capsule for a container, in which the capsule comprises a product passage reducer adapted to extend along an axis from the container, said reducer having an aperture off-centered from the axis to a determinate extent; said cap being rotatably mounted over said reducer, said cap having an aperture off-centered to said determinate extent, said cap being mounted for rotation with respect to said reducer for selectively (1) superposing said off-centered aperture of said cap with said off-centered aperture of said reducer for opening the capsule, and (2) offsetting said off-centered aperture of said cap with said off-centered aperture of said reducer for closing the capsule; said cap having an end, said end having an internal surface; said joint being positioned on said internal surface of said end of said cap, said joint having an off-centered slit diaphragm positioned in alignment with said aperture of said cap; said reducer having two axially extending funnels, each of said funnels being off-centered to said determinate extent, each of said funnels having an end in contact with said joint, the end of a first of said two funnels being open, the end of a second of said two funnels being closed, said open end of said first of said two funnels constituting said off-centered aperture of said reducer, whereby said opening the capsule is effected by cap rotation to superpose said cap aperture and said slit diaphragm of said joint with said open end of said first of said two funnels, and said closing the capsule is effected by cap rotation to superpose said cap aperture and said slit diaphragm of said joint with said closed end of said second of said two funnels, said method of manufacturing said cap and said joint being performed with a single injection mold having a mobile cope and at least one fixed cope, said method comprising:

injection molding said cap with said injection mold;

displacing at least a part of said mobile cope by a determinate amount; and injection molding said joint by injecting material through an opening located on an upper surface of said cap, said opening in said cap being closed by said injected material.

25. A method according to claim 24, wherein:

said displacing comprises setting back said mobile cope by said determinate amount equal to a thickness of said joint.

26. A method according to claim 24, wherein:

said displacing comprises setting back said mobile cope by said determinate amount equal to substantially 0.2 millimeters.

\* \* \* \* \*

UNITED STATES PATENT AND TRADEMARK OFFICE
CERTIFICATE OF CORRECTION

PATENT NO.   : 5,975,354
DATED        : November 2, 1999
INVENTOR(S)  : A. Goncalves It is certified that error appears in the above-identified patent and that said Letters Patent is hereby corrected as shown below:

Title page, item [73], Assignee: change the address of the Assignee, DEFI International, from "Montmorency, France" to --Soisy-Sous-Montmorency, France--.

Signed and Sealed this

Third Day of October, 2000

Attest:

Q. TODD DICKINSON

*Attesting Officer*     *Director of Patents and Trademarks*